(12) United States Patent
Kim et al.

(10) Patent No.: US 11,502,555 B2
(45) Date of Patent: Nov. 15, 2022

(54) SYSTEM AND METHOD FOR WIRELESS POWER TRANSMISSION

(71) Applicant: ELECTRONICS AND TELECOMMUNICATIONS RESEARCH INSTITUTE, Daejeon (KR)

(72) Inventors: Sang-Won Kim, Daejeon (KR); Ho Jin Lee, Daejeon (KR); In Kui Cho, Daejeon (KR); Seong-Min Kim, Daejeon (KR); Jung Ick Moon, Daejeon (KR); Jang Yeol Kim, Daejeon (KR); Je Hoon Yun, Daejeon (KR); Jaewoo Lee, Daejeon (KR); Hyunjoon Lee, Busan (KR); Dong Won Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 17/246,244

(22) Filed: Apr. 30, 2021

(65) Prior Publication Data

US 2021/0351630 A1 Nov. 11, 2021

(30) Foreign Application Priority Data

May 6, 2020 (KR) .......................... 10-2020-0053677

(51) Int. Cl.
*H02J 50/80* (2016.01)
*H02J 50/10* (2016.01)
*H02J 50/90* (2016.01)
*H02J 50/40* (2016.01)

(52) U.S. Cl.
CPC .............. *H02J 50/80* (2016.02); *H02J 50/10* (2016.02); *H02J 50/402* (2020.01); *H02J 50/90* (2016.02)

(58) Field of Classification Search
CPC .. H02J 50/80; H02J 50/90; H02J 50/10; H02J 50/402
USPC ........................................................ 307/149
See application file for complete search history.

(56) References Cited

U.S. PATENT DOCUMENTS

| 9,197,095 | B2 | 11/2015 | Kim et al. | |
|---|---|---|---|---|
| 2013/0207599 | A1* | 8/2013 | Ziv | H02J 50/40 320/108 |
| 2014/0084688 | A1* | 3/2014 | Tzanidis | H02J 7/025 307/42 |

(Continued)

FOREIGN PATENT DOCUMENTS

KR 10-2017-0120585 A 10/2017

*Primary Examiner* — Alfonso Perez Borroto
(74) *Attorney, Agent, or Firm* — Rabin & Berdo, P.C.

(57) ABSTRACT

A wireless power transmission system and method are disclosed. The wireless power transmission system includes a plurality of wireless power transmitters configured to provide power to a plurality of wireless power receivers, and a controller configured to control the wireless power transmitters based on information of the wireless power receivers. The controller is configured to receive information of a wireless power receiver from the wireless power receiver, calculate a transmission parameter associated with a transmission efficiency of power to be provided to the wireless power receiver using the information of the wireless power receiver, and provide power to the wireless power receiver through the wireless power transmitters based on the transmission parameter.

13 Claims, 5 Drawing Sheets

(56) References Cited

U.S. PATENT DOCUMENTS

| | | | | |
|---|---|---|---|---|
| 2014/0292090 A1* | 10/2014 | Cordeiro | ............... | H02J 50/23 |
| | | | | 307/104 |
| 2015/0236526 A1* | 8/2015 | Jadidian | ............... | H02J 5/005 |
| | | | | 320/108 |
| 2016/0079798 A1* | 3/2016 | Jeong | ............... | H02J 50/402 |
| | | | | 320/108 |
| 2018/0254671 A1* | 9/2018 | Murata | ............... | H02J 50/40 |
| 2018/0323637 A1* | 11/2018 | Katabi | ............... | H02J 50/80 |
| 2019/0058349 A1 | 2/2019 | Kim et al. | | |

* cited by examiner

SYSTEM AND METHOD FOR WIRELESS POWER TRANSMISSION

CROSS-REFERENCE TO RELATED APPLICATION(S)

This application claims the priority benefit of Korean Patent Application No. 10-2020-0053677 filed on May 6, 2020, in the Korean Intellectual Property Office, the disclosure of which is incorporated herein by reference for all purposes.

BACKGROUND

1. Field

One or more example embodiments relate to a wireless power transmission system and method, and more particularly, to a method and apparatus that scan wireless power receivers around a wireless power transmission system including a plurality of wireless power transmitters and collect information of each of the wireless power receivers, thereby enabling more effective wireless power transmission to all the wireless power receivers.

2. Description of Related Art

A wireless power transmission technology is applied to various devices in actual life. The application of the wireless power transmission technology in actual use may be found in low-power devices such as smartphones, smartwatches, electric toothbrushes. Recently, there are growing attempts to apply the wireless power transmission technology to medium-power or high-power devices such as home appliances, electric vehicles, and large drones.

As the wireless power transmission technology progresses, there is a desire for a further application of the technology to between a plurality of wireless power transmitters and a plurality of wireless power receivers, in addition to a typical application of the technology to between a single wireless power transmitter and a single wireless power receiver.

However, a required amount of received power differs for each wireless power receiver, and thus simultaneously and effectively charging a plurality of wireless power receivers may not be easy. Also, in a case of a change in a position of a wireless power receiver and the appearance of a new wireless power receiver, real-time reflection of such occurrences may not be easy.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect provides a system and method that provide power to a plurality of wireless power receivers using various sets of information associated with the wireless power receivers to provide power to the wireless power receivers more effectively.

Another aspect also provides a system and method that effectively transmit power from a wireless power transmission system including a plurality of wireless power transmitters to a plurality of wireless power receivers based on various factors such as a position and required received power of each of the wireless power receivers.

According to an example embodiment, there is provided a wireless power transmission system including a plurality of wireless power transmitters configured to provide power to a plurality of wireless power receivers, and a controller configured to control the wireless power transmitters based on information of the wireless power receivers. The controller may receive information of a wireless power receiver from the wireless power receiver, calculate a transmission parameter associated with a transmission efficiency of power to be provided to the wireless power receiver using the information of the wireless power receiver, and provide power to the wireless power receiver through the wireless power transmitters based on the transmission parameter.

The controller may measure a magnitude and a phase of a current flowing in a wireless power transmitter, and determine whether there is a wireless power receiver disposed around the wireless power transmission system based on a change in the magnitude and the phase of the current by the wireless power receiver.

The controller may provide the wireless power receiver with power required for the wireless power receiver to transmit the information of the wireless power receiver, through at least one of the wireless power transmitters.

The controller may periodically increase power required for the wireless power receiver to transmit the information of the wireless power receiver, and provide the increased power through at least one of the wireless power transmitters.

The information of the wireless power receiver may include at least one of a type of the wireless power receiver, a voltage of a battery of the wireless power receiver, presence or absence of an emergency of the wireless power receiver, a distance between the wireless power transmission system and the wireless power receiver, a position of the wireless power receiver, or a required charging amount of the wireless power receiver.

The controller may determine power to be transmitted from each of the wireless power transmitters to the wireless power receivers based on the transmission parameter, and control the wireless power transmitters to provide power to the wireless power receivers based on the determined power.

When the distance between the wireless power transmission system and the wireless power receiver that is included in the information of the wireless power receiver is less than a preset distance, the controller may vary a time for providing power for each of the wireless power receivers and provide power for charging to the wireless power receivers at varying times through the wireless power transmitters.

When the distance between the wireless power transmission system and the wireless power receiver that is included in the information of the wireless power receiver is greater than or equal to the preset distance, the controller may simultaneously provide power for charging to the wireless power receivers.

The controller may periodically receive, from the wireless power receiver, a magnitude and phase of a current flowing in a receiving coil included the wireless power receiver, while providing power for charging to the wireless power receiver.

The controller may determine whether there is a change in the position of the wireless power receiver based on the magnitude and phase of the current flowing in the receiving coil, and update the transmission parameter in response to the change in the position in the wireless power receiver being determined.

According to another example embodiment, there is provided a wireless power transmission method of transmitting power to a plurality of wireless power receivers through a plurality of wireless power transmitters, the wireless power transmission method including receiving information of a wireless power receiver from the wireless power receiver, calculating a transmission parameter associated with a transmission efficiency of power to be provided to the wireless power receiver using the information of the wireless power receiver, and providing power to the wireless power receiver through the wireless power transmitters based on the transmission parameter.

The wireless power transmission method may further include measuring a magnitude and phase of a current flowing in a wireless power transmitter, and determining whether there is a wireless power receiver disposed around a wireless power transmission system including the wireless power transmitters based on a change in the magnitude and phase of the current by the wireless power receiver.

The wireless power transmission method may further include providing the wireless power receiver with power required for the wireless power receiver to transmit the information of the wireless power receiver, through at least one of the wireless power transmitters.

The wireless power transmission method may further include periodically increasing power required for the wireless power receiver to transmit the information of the wireless power receiver, and providing the increased power through at least one of the wireless power transmitters.

The information of the wireless power receiver may include at least one of a type of the wireless power receiver, a voltage of a battery of the wireless power receiver, presence or absence of an emergency of the wireless power receiver, a distance between the wireless power transmission system and the wireless power receiver, a position of the wireless power receiver, or a required charging amount of the wireless power receiver.

The providing may include determining power to be transmitted from each of the wireless power transmitters to the wireless power receivers based on the transmission parameter, and controlling the wireless power transmitters to provide power to the wireless power receivers based on the power determined for each of the wireless power transmitters.

When the distance between the wireless power transmission system and the wireless power receiver that is included in the information of the wireless power receiver is less than a preset distance, the providing may include varying a time for providing power for each of the wireless power receivers and providing power for charging to the wireless power receivers at varying times through the wireless power transmitters.

When the distance between the wireless power transmission system and the wireless power receiver that is included in the information of the wireless power receiver is greater than or equal to the preset distance, the providing may include simultaneously providing power for charging to the wireless power receivers.

The wireless power transmission method may further include periodically receiving, from the wireless power receiver, a magnitude and phase of a current flowing in a receiving coil included the wireless power receiver, while providing power for charging to the wireless power receiver.

The wireless power transmission method may further include determining whether there is a change in the position of the wireless power receiver based on the magnitude and phase of the current flowing in the receiving coil, and updating the transmission parameter in response to the change in the position in the wireless power receiver being determined.

Other features and aspects will be apparent from the following detailed description, the drawings, and the claims.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Figure 1:
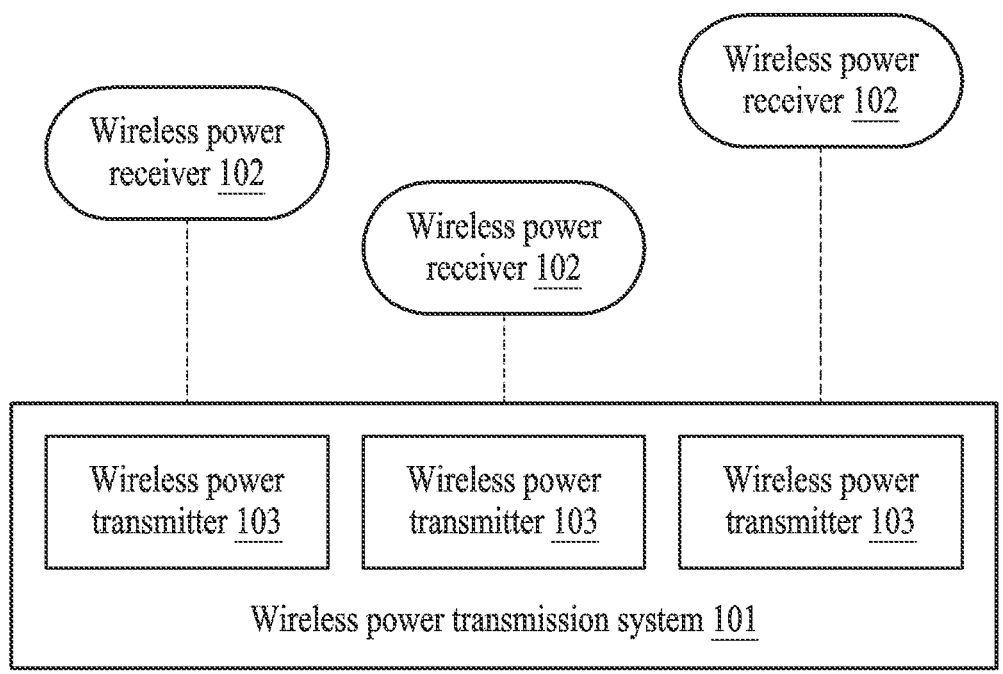
FIG. 1 is a diagram illustrating an example of a relationship between a wireless power receiver and a wireless power transmission system including a plurality of wireless power transmitters according to an example embodiment.

Hereinafter, example embodiments will be described in detail with reference to the accompanying drawings. However, various alterations and modifications may be made to the example embodiments. Here, examples are not construed as being limited to the present disclosure and should be understood to include all changes, equivalents, and replacements within the idea and the technical scope of the disclosure.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof. Although terms such as "first," "second," and "third" may be used herein to describe various members, components, regions, layers, or sections, these members, components, regions, layers, or sections are not to be limited by these terms. Thus, a first member, component, region, layer, or section referred to in examples described herein may also be referred to as a second member, component, region, layer, or section without departing from the teachings of the examples. As used herein, the term "and/or" includes any one and any combination of any two or more of the associated listed items.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of examples, detailed description of well-known related structures or functions will be omitted when it is deemed that such description will cause ambiguous interpretation of the present disclosure. Hereinafter, example embodiments will be described in detail with reference to the accompanying drawings, and like reference numerals in the drawings refer to like elements throughout.

FIG. 1 is a diagram illustrating an example of a relationship between a wireless power receiver and a wireless power transmission system including a plurality of wireless power transmitters according to an example embodiment.

According to an example embodiment, provided herein are a wireless power transmission system 101 and a wireless power transmission method that wirelessly provide power to a plurality of wireless power receivers 102 through a plurality of wireless power transmitters 103. The wireless power transmission system 101 and the wireless power transmission method may be used to provide power with maximum efficiency from the wireless power transmitters 103 to each of the wireless power receivers 102 based on information associated with an arrangement and a required charging amount of the wireless power receivers 102, and the like.

Examples of a wireless power receiver 102 may include a mobile terminal (e.g., a laptop computer, a smartphone, a small drone, etc.), a wearable device (e.g., a smartwatch, a hearing aid, a medical device, an electric toothbrush, etc.), and a high-power device requiring a great amount of power such as a home appliance, an electric vehicle, a large drone, and the like. Although the illustrated wireless power receivers 102 may be devices of different types, they may commonly include at least one receiving coil, a rectifier, a battery, a communication modem, and the like. However, the type of the receiving coil and the rectifier, and the voltage and type of the battery may differ for each wireless power receiver 102.

Power may be transferred or provided from a wireless power transmitter 103 to a wireless power receiver 102 as an alternating current (AC) voltage is applied from a transmitting coil to a receiving coil. For example, a rectifier included in the wireless power receiver 102 may convert the AC voltage applied to the receiving coil to a direct current (DC) voltage and provide the DC voltage to a battery included in the wireless power receiver 102.

Referring to FIG. 1, the wireless power receivers 102 may be disposed at different positions, and be separate from the wireless power transmission system 101 by different distances. A position of a wireless power receiver 102 may be changed even while power is being wirelessly provided to the wireless power receiver 102, or a new wireless power receiver 102 may approach and receive power wirelessly.

Thus, the wireless power transmission system 101 may control the wireless power transmitters 103 to provide power with maximum efficiency to all the wireless power receivers 102 based on information of the wireless power receivers 102 including, for example, a type, an identification (ID), and a position of each wireless power receiver 102, power to be received by each wireless power receiver 102, a magnitude or phase of a current flowing in a receiving coil included in each wireless power receiver 102, a battery voltage of each wireless power receiver 102, a required charging amount of each wireless power receiver 102, a distance between the wireless power transmission system 101 and each wireless power receiver 102, and presence or absence of an emergency in each wireless power receiver 102.

In addition, the wireless power transmission system 101 may provide power with maximum efficiency to all the wireless power receivers 102 by considering situations that change based on a movement or state of the wireless power receivers 102. The maximum efficiency used herein may be construed as maximum power that may be transmitted from the wireless power transmission system 101 to the wireless power receivers 102 in consideration of information of each wireless power receiver 102, the number and arrangement of the wireless power receivers 102, and power transmitted from each wireless power transmitter 103.

For example, information of a wireless power receiver 102 may include a type, an ID, and a position of the wireless power receiver 102, power to be received by the wireless power receiver 102, a magnitude or phase of a current flowing in a receiving coil included in the wireless power receiver 102, a battery voltage of the wireless power receiver 102, a required charging amount of the wireless power receiver 102, a distance between the wireless power transmission system 101 and the wireless power receiver 102, and information on whether there is an emergency associated with the wireless power receiver 102.

The wireless power transmission system 101 may include the wireless power transmitters 103 and a controller configured to control the wireless power transmitters 103. A wireless power transmitter 103 may provide power to a wireless power receiver 102, and include a transmitting coil and a matching circuit configured to perform impedance matching. The impedance matching may refer to adding an intermediate impedance to prevent a rapid change of an impedance.

A detailed configuration of the controller included in the wireless power transmission system 101, and a detailed operation of controlling the wireless power transmitters 103 based on the information of the wireless power receivers 102 to provide power with maximum efficiency to all the wireless power receivers 102 will be described hereinafter with reference to FIG. 2.

Figure 2:
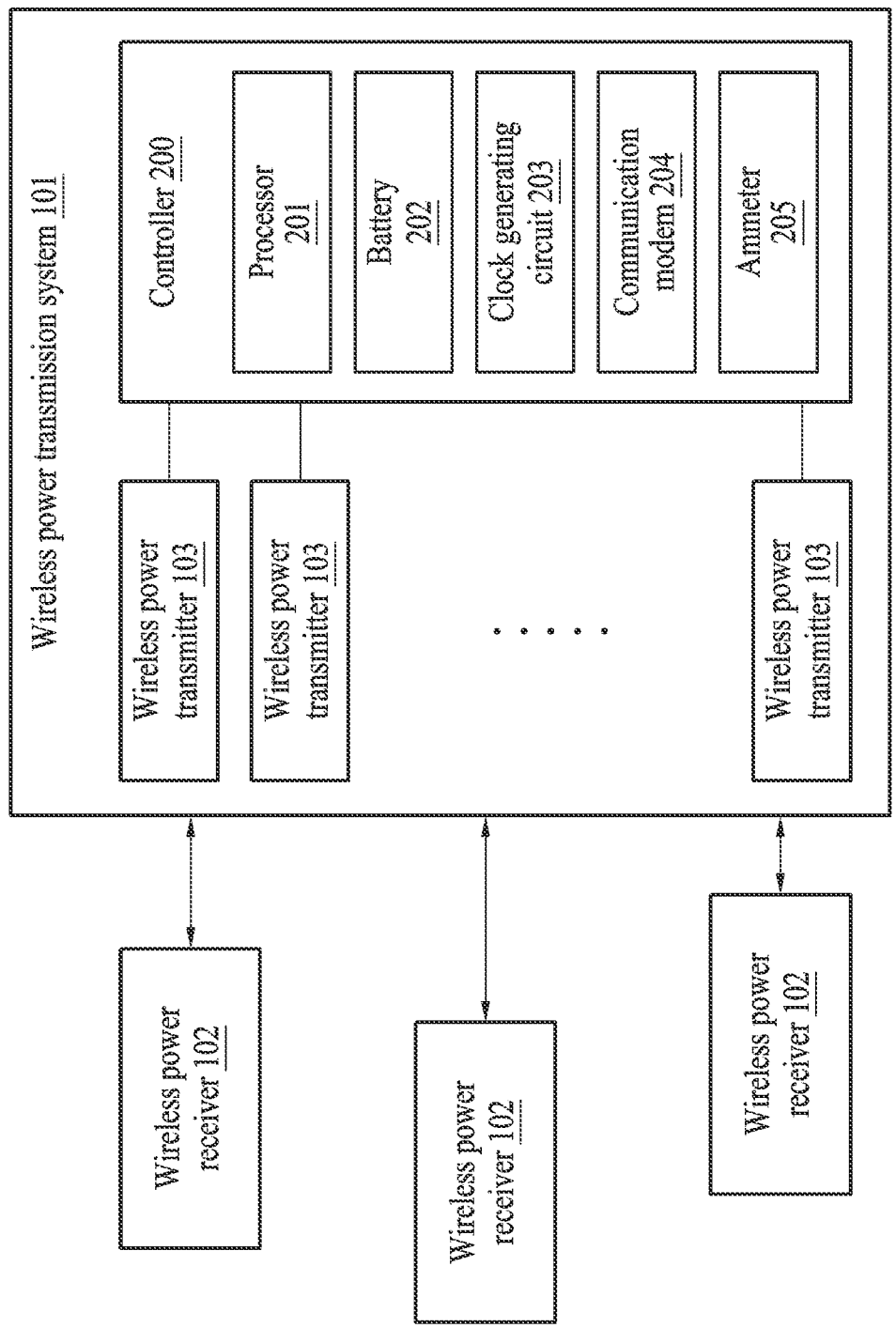
FIG. 2 is a diagram illustrating an example of a configuration of a wireless power transmission system according to an example embodiment.

FIG. 2 is a diagram illustrating an example of a configuration of a wireless power transmission system according to an example embodiment.

Referring to FIG. 2, a controller 200 included in a wireless power transmission system 101 includes a processor 201 configured to perform control, a battery 202 configured to supply DC power, a clock generating circuit 203 configured to generate a clock, a communication modem 204 configured to receive information of wireless power receivers 102 from the wireless power receivers 102, and an ammeter 205 configured to measure a magnitude and phase of a current flowing in transmitting coils included in the wireless power transmitters 103.

A magnitude of power transmitted by a wireless power transmitter 103 may be controlled by controlling a voltage of the battery 202 included in the controller 200 or a duty from the clock generating circuit 203 included in the controller 200.

The processor 201 included in the controller 200 may control the wireless power transmitters 103 based on the information of the wireless power receivers 102 such that power is provided with maximum efficiency to all the wireless power receivers 102. Alternatively, dissimilar to what is illustrated in FIG. 2, each of the wireless power transmitters 103 may include the controller 200.

In detail, the controller 200 may apply a voltage to the battery 202 in a state in which there is no wireless power receiver 102 around the wireless power transmission system 101, and measure a magnitude and phase of a current flowing in the transmitting coils included in the wireless power transmitters 103 using the ammeter 205.

When there is no wireless power receiver 102 nearby, a current and a phase of a transmitting coil may be permanently constant. However, when there is a new wireless power receiver 102 approaching near the wireless power transmission system 101, a magnitude and phase of a current flowing in a transmitting coil included in a wireless power transmitter 103 may change or a magnitude and phase of an input current of a transmission inverter may change. Here, the expressions "nearby" and "near or around the wireless power transmission system 101" may indicate a range in which power is provided by a wireless power transmitter 103 included in the wireless power transmission system 101. The transmission inverter may be a component configured to convert a DC current flowing in a transmitting coil to an AC current and included in a wireless power transmitter 103 along with the transmission coil.

For example, in a case in which there is a change in a magnitude and phase of a current by the wireless power receivers 102, the controller 200 may determine the presence around the wireless power transmission system 101 through the ammeter 205. In addition, the controller 200 may measure a magnitude and phase of a current flowing in a transmitting coil included in each of the wireless power transmitters 103, and thus determine a transmission impedance of each of the wireless power transmitters 103. The determined transmission impedance may be used for calculating a transmission parameter to be described hereinafter.

The controller 200 may provide power that is required for the wireless power receivers 102 to transmit the information of the wireless power receivers 102 through the wireless power transmitters 103 in order to determine the number and arrangement of the wireless power receivers 102 disposed around the wireless power transmission system 101. The power required for the wireless power receivers 102 to transmit the information of the wireless power receivers 102 may be provided from the wireless power transmitters 103, not from an internal power supply.

For example, in a case in which a wireless power receiver 102 disposed around the wireless power transmission system 101 receives power required for the wireless power receiver 102 to transmit information of the wireless power receiver 102, the wireless power receiver 102 may transmit the information of the wireless power receiver 102 to the controller 200 to additionally receive power.

However, the wireless power receivers 102 may be disposed at different positions as illustrated in FIGS. 1 and 2, and require different amounts of power to transmit different sets of information of the wireless power receivers 102. In addition, as a distance from a wireless power transmitter 103 increases, a magnitude of power to be received by a corresponding wireless power receiver 102 may decrease. Thus, the controller 200 may periodically increase a magnitude of power to be transmitted to the wireless power receiver 102 and transmit the power with the increased magnitude to the wireless power receiver 102.

The controller 102 may transmit power required for a wireless power receiver 102 to transmit information of the wireless power receiver 102 through at least one of the wireless power transmitters 103. That is, the controller 200 may control the wireless power transmitters 103 such that all the wireless power transmitters 103 provide the power required for the transmission of the information of the wireless power receivers 102.

Alternatively, in a case in which the wireless power transmitters 103 are arranged in a form of a circle or a quadrangle, the controller 200 may group neighboring wireless power transmitters 103 among the wireless power transmitters 103 and control the grouped wireless power transmitters 103 to provide the power required for the transmission of the information of the wireless power receivers 102.

For example, in a case in which the wireless power transmitters 103 are arranged in a form of a quadrangle, the controller 200 may provide the power required for the transmission of the information of the wireless power receivers 102 through wireless power transmitters 103 belonging to a certain row or column of such a quadrangular arrangement.

The controller 200 may receive information of a wireless power receiver 102 from the wireless power receiver 102 disposed around the wireless power transmission system 101. The controller 200 may determine the number and arrangement of the wireless power receivers 102 based on the information of the wireless power receivers 102.

For example, information of each of the wireless power receivers 102 may be individually received, and thus the controller 200 may identify an ID included in the information of each of the wireless power receivers 102 and determine the number of wireless power receivers 102 disposed around the wireless power transmission system 101. In addition, the controller 200 may receive a position of each of the wireless power receivers 102 that is included in the information of the wireless power receivers 102, and determine the arrangement of the wireless power receivers 102 disposed around the wireless power transmission system 101.

The controller 200 may calculate transmission parameters associated with respective transmission efficiencies of power to be provided to the wireless power receivers 102 using the information of the wireless power receivers 102.

For example, the controller 200 may set a voltage and phase for a transmitting coil included in each of the wireless power transmitters 103. The controller 200 may then extract a coupling coefficient or mutual inductance between transmitting coils and receiving coils using a magnitude and phase of a current of the receiving coils or a rectified voltage that are included in the information of the wireless power receivers 102.

In addition, the controller 200 may determine a transmitter input voltage and a clock phase control for transmitting maximum power to each of the wireless power receivers 102 based on the extracted coupling coefficient or mutual inductance.

The transmission parameters used herein may indicate a voltage and clock phase of each transmitting coil that are determined based on all coupling coefficients between the receiving coils included in all the wireless power receivers 102 and the transmitting coils included in all the wireless power transmitters 103. That is, the controller 200 may determine a ratio of a current of a transmitting coil proportional to a coupling coefficient or a mutual inductance between the transmitting coil and a receiving coil, and calculate a transmission parameter by calculating a voltage and clock phase of each transmitting coil such that the magnitude of a current of each transmitting coil is proportional to a coupling coefficient and phases of currents of the transmitting coils are the same.

The controller 200 may calculate a voltage of a transmitting coil from a transmission impedance as represented by Equation 1 below.

$$\vec{v}_T^{bf} = (Z_T + \omega^2 M^T Z_R^{-1} M) \vec{i}_T^{bf}. \quad \text{[Equation 1]}$$

In Equation 1, $V_T$ denotes a phase of a voltage of a transmitting coil, and $i_T$ denotes a phase of a current flowing in the transmitting coil. $Z_T$ denotes a transmission impedance, and $Z_R$ denotes a reception impedance of a receiving coil. $\omega$ denotes a coupling coefficient, and M denotes a mutual inductance. When there is no receiving coil, the transmission impedance may be determined from a relationship indicated as $V_T = Z_T * I_T$.

As the coupling coefficient increases, a greater AC voltage may be provided from the transmitting coil to the receiving coil. The coupling coefficient may be calculated for each one-to-one relationship between each of all transmitting coils and each of all receiving coils. For example, in a case in which there are N receiving coils and M transmitting coils, N×M coupling coefficients may be calculated.

In detail, the controller 200 may calculate a coupling coefficient based on a magnitude and phase of a current flowing in a receiving coil of a wireless power receiver 102. The magnitude and phase of the current flowing in the receiving coil may vary based on a position of the wireless power receiver 102, a distance from the wireless power transmission system 101, and a voltage of the battery 202. Thus, the controller 200 may consider the position and the distance of the wireless power receiver 102 and the voltage of the battery 202 for the magnitude and phase of the current flowing in the receiving coil when determining the transmission parameter.

The controller 200 may transmit a current or power of a transmitting coil based on a ratio of coupling coefficients between a receiving coil of a wireless power receiver 102 and transmitting coils, using a maximum eigenvalue and Lagrange multiplier method.

Here, when there is a new wireless power receiver 102 approaching nearby or when there is a change in a wireless power receiver 102 that is being charged, the controller 200 may calculate a new coupling coefficient, and adjust a current flowing in each transmitting coil or determine again a priority of the wireless power receiver 102 that is to be a target for charging.

For example, when a battery of a wireless power receiver 102 among the wireless power receivers 102 is nearly used up and is thus at risk of being discharged or requires fast charging, the controller 200 may increase a priority of the wireless power receiver 102 to transmit power to the wireless power receiver 102 having the increased priority.

In addition, the transmission parameters may be re-calculated to increase a total efficiency of the wireless power transmission system 101. Alternatively, the transmission parameters may be re-calculated when the wireless power receivers 102 do not receive receptible maximum power. For example, a case in which a wireless power receiver 102 does not receive the receptible maximum power may include, for example, a case in which a coupling coefficient is small although the wireless power receiver 102 requires 5 watts (W) of received power, or a case in which power that is being received is extremely low due to a wireless power receiver 102 nearby.

The controller 200 may provide power to the wireless power receivers 102 through the wireless power transmitters 103 based on the transmission parameters. For example, when a coupling coefficient between a receiving coil of a wireless power receiver 102 and a corresponding transmitting coil of a wireless power transmitter 103 is less than a preset reference, the controller 200 may suspend providing power to the wireless power receiver 102 and thereby improve the total efficiency of the wireless power transmission system 101.

In addition, when a difference in a coupling coefficient between the wireless power receivers 102 is less than a preset reference and respective required charging amounts of the wireless power receivers 102 are the same, the controller 200 may control the wireless power transmitters 103 such that the wireless power receivers 102 receive power simultaneously based on the coupling coefficient.

Here, a case in which the difference in coupling coefficient is less than the preset reference may include, for example, a case in which a difference in distance of the wireless power receivers 102 is less than or equal to a preset reference, and a case in which an interval by which the wireless power receivers 102 are arranged therebetween is greater than or equal to a preset reference. Here, the distance may indicate a distance between the wireless power transmission system 101 and each of the wireless power receivers 102.

In contrast, when the difference in coupling coefficient between the wireless power receivers 102 is greater than the preset reference and the required charging amounts of the wireless power receivers 102 are different from each other, the controller 200 may control the wireless power transmitters 103 such that the wireless power receivers 102 receive power at different times based on the coupling coefficient.

That is, the controller 200 may divide a time based on the number of the wireless power receivers 102, and control the wireless power transmitters 103 such that the wireless power receivers 102 receive power at the divided times based on the coupling coefficient.

The controller 200 may provide power only to a single wireless power receiver 102 at a certain time, and thus remaining wireless power receivers 102 may receive no power and their receiving coils may be blocked. Here, the controller 200 may provide power by changing a magnitude and phase of a current to be transmitted according to the wireless power receiver 102. In addition, the controller 200 may determine an order of the wireless power receivers 102 for receiving power based on the presence or absence of an emergency, the required charging amounts, and the like that are included in the information of the wireless power receivers 102.

For example, in a case in which a wireless power receiver 102 among the wireless power receivers 102 nearly uses up a battery and is thus at risk of being discharged or requires fast charging, the controller 200 may increase a priority of the wireless power receiver 102 and transmit power to the wireless power receiver 102 with the increased priority.

For example, in a case in which a difference in coupling coefficient between some of the wireless power receivers 102 is greater than the preset reference and a difference in coupling coefficient between other wireless power receivers 102 is less than the preset reference, the controller 200 may divide the wireless power transmitters 103 such that some of the wireless power transmitters 103 simultaneously provides power to some of the wireless power receivers 102 and other wireless power transmitters 103 provide power to the other wireless power receivers 102 at different times.

When providing power to the wireless power receivers 102 through the wireless power transmitters 103, the controller 200 may determine power to be transmitted from each of the wireless power transmitters 103 to the wireless power receivers 102 based on the transmission parameters, and control the wireless power transmitters 103 to provide power to the wireless power receivers 102 based on the determined power.

For example, the controller 200 may determine a transmission parameter based on a ratio of a coupling coefficient, and provide power to a wireless power receiver 102 through a wireless power transmitter 103 based on the determined transmission parameter. When transmitting power to the wireless power receivers 102 at different times, the controller 200 may preferentially transmit power to a wireless power receiver 102 having a low coupling coefficient.

For another example, in a case in which a wireless power receiver 102 has a greatest coupling coefficient among a plurality of coupling coefficients calculated with respect to a receiving coil included in the wireless power receiver 102, the controller 200 may determine a transmitting coil corresponding to the receiving coil and provide power to the wireless power receiver 102 through a wireless power transmitter 103 including the transmitting coil.

The controller 200 may periodically receive a magnitude and phase of a current flowing in a receiving coil included in a wireless power receiver 102 from the wireless power receiver 102 while providing power for charging to the wireless power receiver 102. The controller 200 may determine whether there is a change in a position of the wireless power receiver 102 based on the received magnitude and phase of the current.

When there is the change in the position of the wireless power receiver 102, the controller 200 may re-calculate and update the already calculated transmission parameters. The controller 200 may then provide power to the wireless power receivers 102 through the wireless power transmitters 103 based on the updated transmission parameters.

Figure 3A:
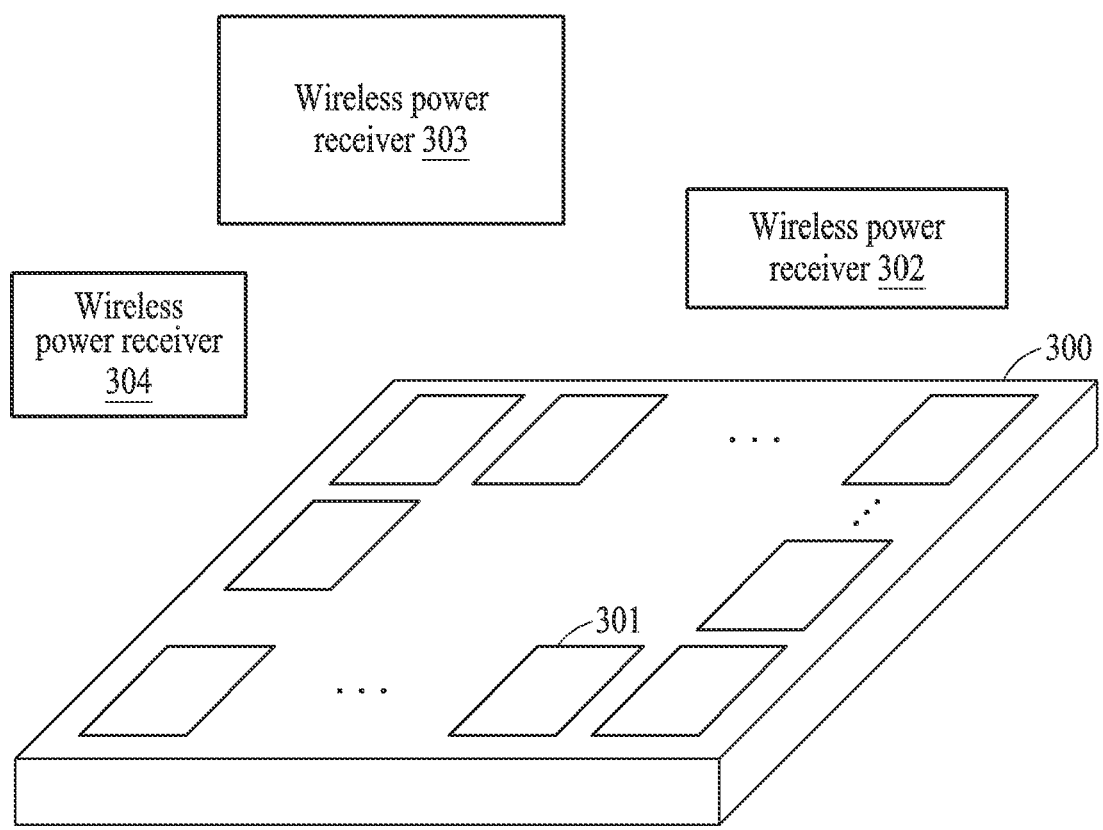
FIG. 3A is a diagram illustrating an example of how a plurality of wireless power receivers receives power according to an example embodiment.

FIG. 3A is a diagram illustrating an example of how a plurality of wireless power receivers receives power according to an example embodiment.

Referring to FIG. 3A, a wireless power transmission system 300 may be provided in a form of a quadrangular plane. In addition, referring to FIG. 3A, wireless power transmitters 301 each provided in a form of a quadrangular plane may be arranged in a form of a quadrangle on the wireless power transmission system 300. The form of the wireless power transmission system 300 and the form of the wireless power transmitters 301 illustrated in FIG. 3A are provided merely as an example, and thus the wireless power transmission system 300 may also be provided in a form of a circle and the wireless power transmitters 301 may be arranged in other forms.

The wireless power transmitters 301 may be arranged in various forms, such as, for example, a circle and a quadrangle, on a plane, and an interval between the wireless power transmitters 310 may be constant or adjusted arbitrarily. In a case in which the wireless power transmitters 301 are arranged by being overlapped with each other, there may be an effect of reducing a mutual inductance between transmitting coils. However, in such a case, an area in the wireless power transmitters 301 that provides power may be reduced.

The arrangement of the wireless power transmitters 301 may be expanded to a three-dimensional (3D) structure, for example, a regular hexahedron with six faces, in addition to the plane. In such a case, the wireless power transmitters 301 may be arranged on the six faces. However, the planar arrangement (on the plane) may suffice for a controller to control a magnitude and phase of a current flowing in a transmitting coil included in each of the wireless power transmitters 301 and enable charging in a 3D area.

In a case in which the wireless power transmitters 301 are arranged in a form of a quadrangle as illustrated in FIG. 3A for the controller to provide power required for transmission of information of wireless power receivers, the controller may provide the power required for the transmission of the information of the wireless power receivers through wireless power transmitters 301 included in a certain row or column of such a quadrangular arrangement.

Also, when the controller provides power through the wireless power transmitters 301, wireless power receivers (e.g., wireless power receivers 302, 303, and 304 illustrated in FIG. 3A) may differ in size, type, position, and distance.

The controller may receive information of the wireless power receivers 302, 303, and 304 from the wireless power receivers 302, 303, and 304, and calculate a transmission parameter by determining a coupling coefficient between a receiving coil included in the wireless power receivers 302, 303, and 304 and a transmitting coil included in the wireless power transmitter 301.

The controller may determine whether to provide power by dividing time or provide power simultaneously based on a difference in the determined coupling coefficient, and provide power through the wireless power transmitters 301 based on the coupling coefficient.

Figure 3B:
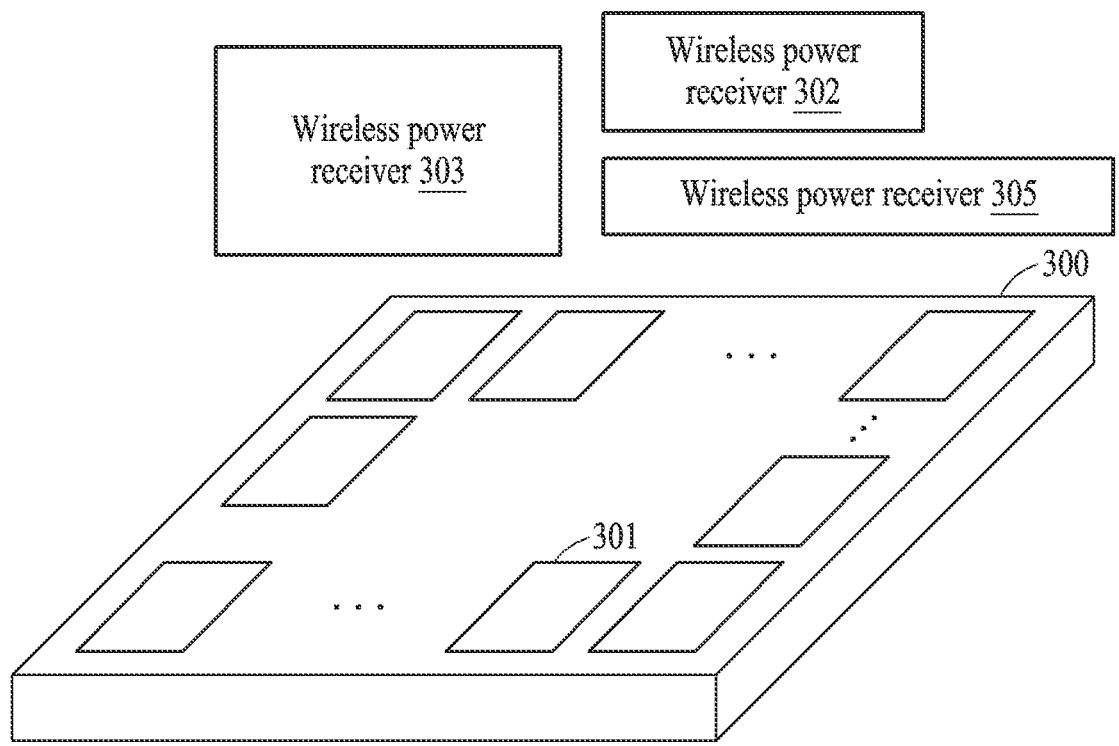
FIG. 3B is a diagram illustrating an example of a situation in which there is a change in a plurality of wireless power receivers according to an example embodiment.

FIG. 3B is a diagram illustrating an example of a situation in which there is a change in a plurality of wireless power receivers according to an example embodiment.

FIG. 3B illustrates an example situation in which the wireless power receiver 304 of FIG. 3A moves out of a transmission range of the wireless power transmission system 100, positions of the other wireless power receivers 302 and 303 of FIG. 3A are changed, and a new wireless power receiver 305 is included in the transmission range of the wireless power transmission system 300.

In the example of FIG. 3A, the controller may periodically receive information on a magnitude and phase of a current flowing in a receiving coil from the wireless power receivers 302, 303, and 304 while providing power to the wireless power receivers 302, 303, and 304, and thus the controller may determine whether the wireless power receiver 304 is out of the transmission range and the positions of the wireless power receivers 302 and 303 are changed.

The controller may receive again information of the wireless power receivers 302 and 303 from the wireless power receivers 302 and 303, and determine again a coupling coefficient based on the changed positions.

The controller may determine a change in a magnitude and phase of a current flowing in a transmitting coil included in the wireless power transmitters 301 by the wireless power receiver 305, and detect that the new wireless power receiver 305 is included in the transmission range.

Alternatively, in the example of FIG. 3A, the controller may provide power required for a wireless power receiver to transmit information of the wireless power receiver on a periodic basis while providing power to the wireless power receivers, and may thus receive the information of the wireless power receiver 305 from the wireless power receiver 305.

The controller may calculate coupling coefficients between receiving coils included in all the wireless power receivers 302, 303, and 305 and the transmitting coils included in all the wireless power transmitters 301, and provide power through the wireless power transmitters 301 based on the coupling coefficients.

Figure 4:
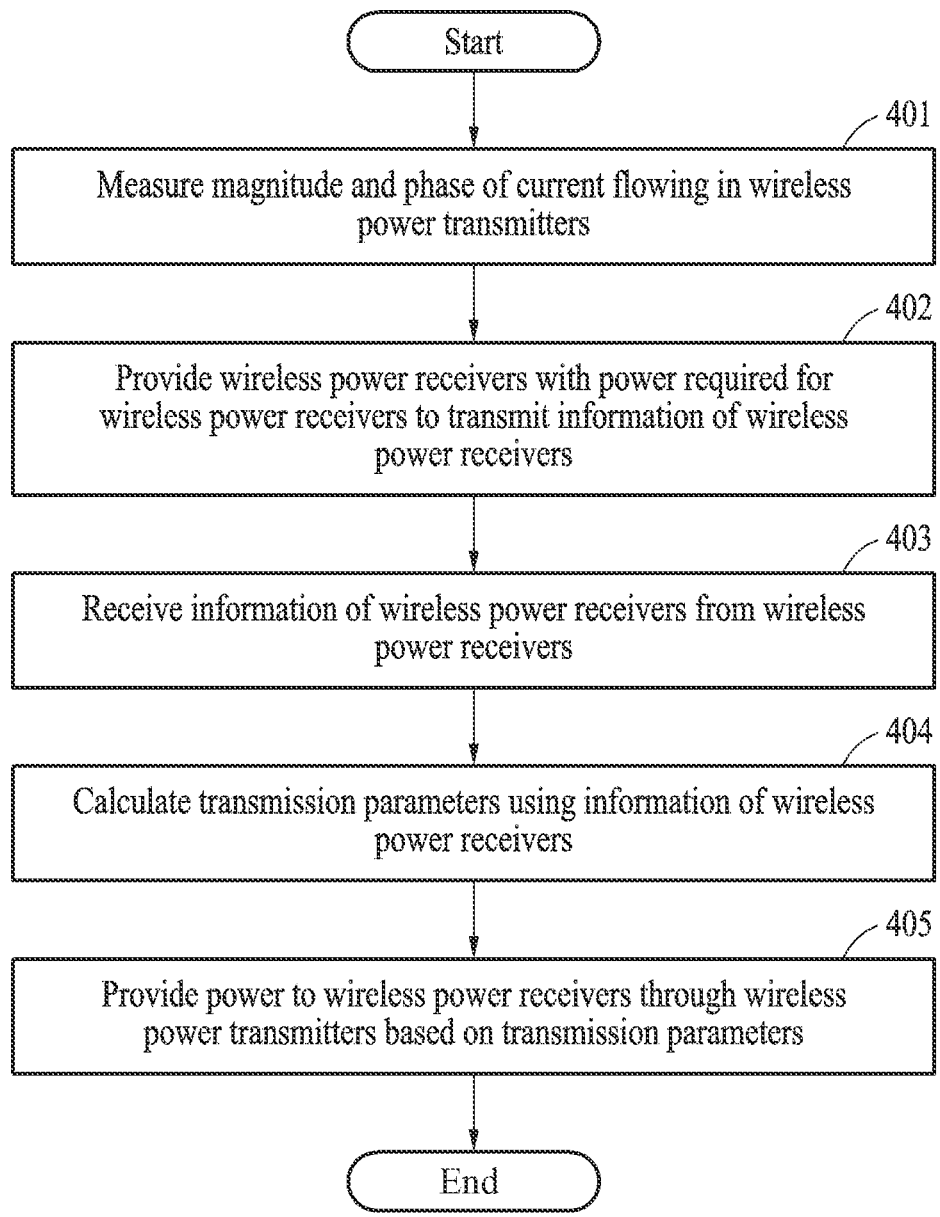
FIG. 4 is a flowchart illustrating an example of a wireless power transmission method according to an example embodiment.

FIG. 4 is a flowchart illustrating an example of a wireless power transmission method according to an example embodiment.

A wireless power transmission method of transmitting power to a plurality of wireless power receivers through a plurality of wireless power transmitters may be performed by a controller included in a wireless power transmission system.

Referring to FIG. 4, in operation 401, the controller of the wireless power transmission system measures a magnitude and phase of a current flowing in a wireless power transmitter, and determines whether a wireless power receiver is disposed around the wireless power transmission system based on a change in the magnitude and phase of the current by the wireless power receiver.

In operation 402, the controller of the wireless power transmission system provides the wireless power receiver with power required for the wireless power receiver to transmit information of the wireless power receiver, through at least one of a plurality of wireless power transmitters.

When the wireless power receiver receives the power required for transmitting the information of the wireless power receiver, the wireless power receiver may transmit the information of the wireless power receiver to the controller to additionally receive power.

The information of the wireless power receiver may include, for example, a type, an ID, and a position of the wireless power receiver, power to be received by the wireless power receiver, a magnitude or phase of a current flowing in a receiving coil included in the wireless power receiver, a battery voltage of the wireless power receiver, a required charging amount of the wireless power receiver, a distance between the wireless power transmission system and the wireless power receiver, and information as to whether there is an emergency associated with the wireless power receiver.

In operation 403, the controller of the wireless power transmission system receives the information of the wireless power receiver from the wireless power receiver. In operation 404, the controller of the wireless power transmission system calculates a transmission parameter associated with a transmission efficiency of power to be provided to each of wireless power receivers using the information of the wireless power receiver.

The transmission parameter may include all coupling coefficients between receiving coils included in all the wireless power receivers and transmitting coils included in all the wireless power transmitters. When a difference in coupling coefficient between the wireless power receivers is less than a preset reference and respective required charging amounts of the wireless power receivers are the same, the controller may control the wireless power transmitters such that the wireless power receivers receive power simultaneously based on the coupling coefficients.

In contrast, when the difference in coupling coefficient between the wireless power receivers is greater than the preset reference and the required charging amounts of the wireless power receivers are different, the controller may control the wireless power transmitters such that the wireless power receivers receive power at different times.

In operation 405, the controller of the wireless power transmission system provides power to the wireless power receivers through the wireless power transmitters based on the transmission parameter.

According to an example embodiment described herein, power may be effectively provided to a plurality of wireless power receivers using various sets of information associated with the wireless power receivers.

According to an example embodiment described herein, power may be effectively transmitted from a wireless power transmission system including a plurality of wireless power transmitters to a wireless power receiver based on various factors including a position of each wireless power receiver, a required amount of power to be received by each wireless power receiver, and the like.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A wireless power transmission system comprising:
   a plurality of wireless power transmitters configured to provide power to a plurality of wireless power receivers; and
   a controller configured to control the wireless power transmitters based on information of the wireless power receivers,
   wherein the controller is configured to:
     receive information of a wireless power receiver from the wireless power receiver, calculate a transmission parameter associated with a transmission efficiency of power to be provided to the wireless power receiver using the information of the wireless power receiver, and provide power to the wireless power receiver through the wireless power transmitters based on the transmission parameter; and
   wherein the controller is configured to:
     when a distance between the wireless power transmission system and the wireless power receiver that is included in the information of the wireless power receiver is less than a preset distance, vary a time for providing power for each of the wireless power receivers and provide power for charging to the wireless power receivers at varying times through the wireless power transmitters.

2. The wireless power transmission system of claim 1, wherein the controller is configured to:
   measure a magnitude and a phase of a current flowing in a wireless power transmitter, and determine whether there is a wireless power receiver disposed around the wireless power transmission system based on a change in the magnitude and the phase of the current by the wireless power receiver.

3. The wireless power transmission system of claim 1, wherein the controller is configured to:
   provide the wireless power receiver with power required for the wireless power receiver to transmit the information of the wireless power receiver, through at least one of the wireless power transmitters.

4. The wireless power transmission system of claim 1, wherein the controller is configured to:
   periodically increase power required for the wireless power receiver to transmit the information of the wireless power receiver, and provide the increased power through at least one of the wireless power transmitters.

5. The wireless power transmission system of claim 1, wherein the information of the wireless power receiver comprises at least one of a type of the wireless power receiver, a voltage of a battery of the wireless power receiver, presence or absence of an emergency of the wireless power receiver, a distance between the wireless power transmission system and the wireless power receiver, a position of the wireless power receiver, or a required charging amount of the wireless power receiver.

6. The wireless power transmission system of claim 1, wherein the controller is configured to:
   determine power to be transmitted from each of the wireless power transmitters to the wireless power receivers based on the transmission parameter, and control the wireless power transmitters to provide power to the wireless power receivers based on the determined power.

7. The wireless power transmission system of claim 1, wherein the controller is configured to:
   when a distance between the wireless power transmission system and the wireless power receiver that is included in the information of the wireless power receiver is greater than or equal to a preset distance, simultaneously provide power for charging to the wireless power receivers.

8. The wireless power transmission system of claim 1, wherein the controller is configured to:
   periodically receive, from the wireless power receiver, a magnitude and phase of a current flowing in a receiving coil included the wireless power receiver, while providing power for charging to the wireless power receiver.

9. The wireless power transmission system of claim 8, wherein the controller is configured to:
   determine whether there is a change in a position of the wireless power receiver based on the magnitude and phase of the current flowing in the receiving coil, and update the transmission parameter in response to the change in the position in the wireless power receiver being determined.

10. A wireless power transmission method of transmitting power to a plurality of wireless power receivers through a plurality of wireless power transmitters, the wireless power transmission method comprising:
    receiving information of a wireless power receiver from the wireless power receiver;
    calculating a transmission parameter associated with a transmission efficiency of power to be provided to the wireless power receiver using the information of the wireless power receiver;
    providing power to the wireless power receiver through the wireless power transmitters based on the transmission parameter; and
    periodically increasing power required for the wireless power receiver to transmit the information of the wireless power receiver, and providing the increased power through at least one of the wireless power transmitters.

11. The wireless power transmission method of claim 10, further comprising:

measuring a magnitude and phase of a current flowing in a wireless power transmitter, and determining whether there is a wireless power receiver disposed around a wireless power transmission system including the wireless power transmitters based on a change in the magnitude and phase of the current by the wireless power receiver.

12. The wireless power transmission method of claim 10, further comprising:

providing the wireless power receiver with power required for the wireless power receiver to transmit the information of the wireless power receiver, through at least one of the wireless power transmitters.

13. A wireless power transmitter comprising:

a plurality of transmitting coils configured to transmit a voltage to at least one receiving coil; and a processor, wherein the processor is configured to:

detect a receiving coil included in a wireless power receiver by measuring a magnitude and phase of a current flowing in each of the transmitting coils;

when the receiving coil is detected, transmit power required for the wireless power receiver to provide information on a magnitude and phase of a current of the receiving coil, and receive the information on the magnitude and phase of the current of the receiving coil from the wireless power receiver;

calculate a coupling coefficient between the transmitting coils and the receiving coil based on the magnitude and phase of the current of the receiving coil;

determine a voltage and phase of power of the transmitting coils for transmitting power to the receiving coil using the calculated coupling coefficient;

wirelessly provide power to the receiving coil through the transmitting coils based on the voltage and phase of the transmitting coils; and periodically increase the power required for the wireless power receiver to provide the information of the wireless power receiver, and providing the increased power through at least one of the transmitting coils.

* * * * *